United States Patent [19]

Yeh

[11] Patent Number: 4,998,595
[45] Date of Patent: Mar. 12, 1991

[54] STRUCTURE OF LATERAL DRIVING DEVICE FOR CAR

[75] Inventor: Pin Yen Yeh, Taipei, Taiwan
[73] Assignee: Cheng Chen Lin, Hsien, Taiwan
[21] Appl. No.: 323,371
[22] Filed: Mar. 14, 1989
[51] Int. Cl.$^5$ ............................................. B60S 9/215
[52] U.S. Cl. .................................................... 180/202
[58] Field of Search ........................ 180/199, 200, 202

[56] References Cited

U.S. PATENT DOCUMENTS 3,003,571 10/1961 Ash et al. ............................. 180/202

FOREIGN PATENT DOCUMENTS 551143 1/1958 Canada ................................. 180/202

Primary Examiner—Charles A. Marmor
Assistant Examiner—Richard Camby
Attorney, Agent, or Firm—Fleit, Jacobson, Cohn, Price, Holman & Stern

[57] ABSTRACT

An improved structure of lateral driving device for car, particularly related to a simple hydraulic loop and structural element to achieve the purpose of laterally driving the car through a remote control device to control the operating sequence thereof and the power source of hydraulic pump is the engine torque of car at neutral so that the car can park in a limited space to fully utilize the parking space and to lessen the driver's trouble when parking and this device is in favor of replacing the wheel or repairing the car when the vehicle body is lifted from the ground.

8 Claims, 4 Drawing Sheets

STRUCTURE OF LATERAL DRIVING DEVICE FOR CAR

BACKGROUND OF THE INVENTION

In restricted areas with dense populations, transportation vehicles are already in a state of saturation even subways or overhead bridges fail to relieve the traffic congestion. This situation mainly results from the arbitrary parking of cars at the roadside. With the limited availability of parking lots, the parking area at the roadside are conveniently used by drivers for their own convenience. If the length of the parking space available is approximately the same as that of the driver's car and there is no extra room left, the driver, even with high driving skills, cannot park his or her car in the parking space or drive the car therefrom. The inventor strongly feels that parking a car in a limited space is a time-wasting and pains-taking undertaking.

The conventional hydraulic drive type lateral driving device for a car comprises four sets of lifting wheels on the axle and chassis of a car and use a battery as a power source to drive the hydraulic device so as to achieve horizontal extension and retraction, thereof, the operating sequence of this system as a whole being controllable from a an control panel which is installed on the instrument panel. However, such a structure tends to have an adverse effect on the whole structure of the car because the lateral driving device is suspended onto from the axle, and the power source, namely, the battery, tends to fail to actuate the lateral driving device if the battery is run down so that although this system can affect lateral movement of a car it still suffers from the disadvantages described above.

The present invention is designed to eliminate the abovementioned drawbacks. It is a lateral driving device employing the available accesory devices of a car to use the engine torque of the car in neutral as the required power through a number of improving modifications and field experiments, and its operating sequence can be controlled by a remote control device for parking the car.

The primary object of the present invention is to offer a device for laterally driving a car towards the left or right through installing four sets of retractable driving wheels to the bottom of the car. A reciprocating hydraulic cylinder on each driving wheel lifts the car from the ground, and a hydraulic motor drives the corresponding driving wheel.

A secondary object of the present invention is to offer a device which does not affect the normal driving of a car when the driving wheel is retracted beneath the chassis between the bumper and the vehicle wheel.

Another object of the present invention is to offer a device to simplify the hydraulic system thereof to systematically control the operation thereof by means of remote-control so as to make the operation thereof more simple and convenient.

Another object of the present invention is to offer a device to be actuated by the engine torque of a car in neutral as the power source of a hydraulic pump thereof so as to lower the cost of said device and to decrease the required installation space thereof.

SUMMARY OF THE INVENTION

The present invention comprise a frame installed between the front bumper and wheels and rear bumper and a frame installed between the the wheels of a car and each fixed onto the frame cross member of the chassis, a pair of driving wheel assemblies being installed on each frame which can be extended and retracted by another hydraulic cylinder provided on said frame, a small wheel at an end portion of each driving wheel is mounted for rotation about an axis which is perpendicular to that of the vehicle wheel and is connected to a reciprocating hydraulic cylinder pivotally connected to the frame, a electromagnetic clutch is provided on a shaft of an hydraulic pump, and the end of said shaft is connected to the belt roller the car engine by means of a belt, a hydraulic controller is installed near the front and rear driving wheel assemblies respectively, and a remote control signal receiver is disposed in the car trunk. Therefore when the driver intends to use the present invention, the remote controller can be used to drive the electromagnetic clutch on the wheel of the hydraulic pump, the hydraulic cylinder can be driven through the hydraulic oil to lower the driving wheel assembly to be perpendicular to the ground, and the hydraulic oil through the commutation of hydraulic controller can drive the reciprocating hydraulic cylinder once again to lift the car from the ground to a suitable height and finally, to let the hydraulic motor actuate the small wheel so as to laterally move the car toward the left or right.

DETAILED DESCRIPTION OF THE PREFERRED EMBODIMENT

Figure 1:
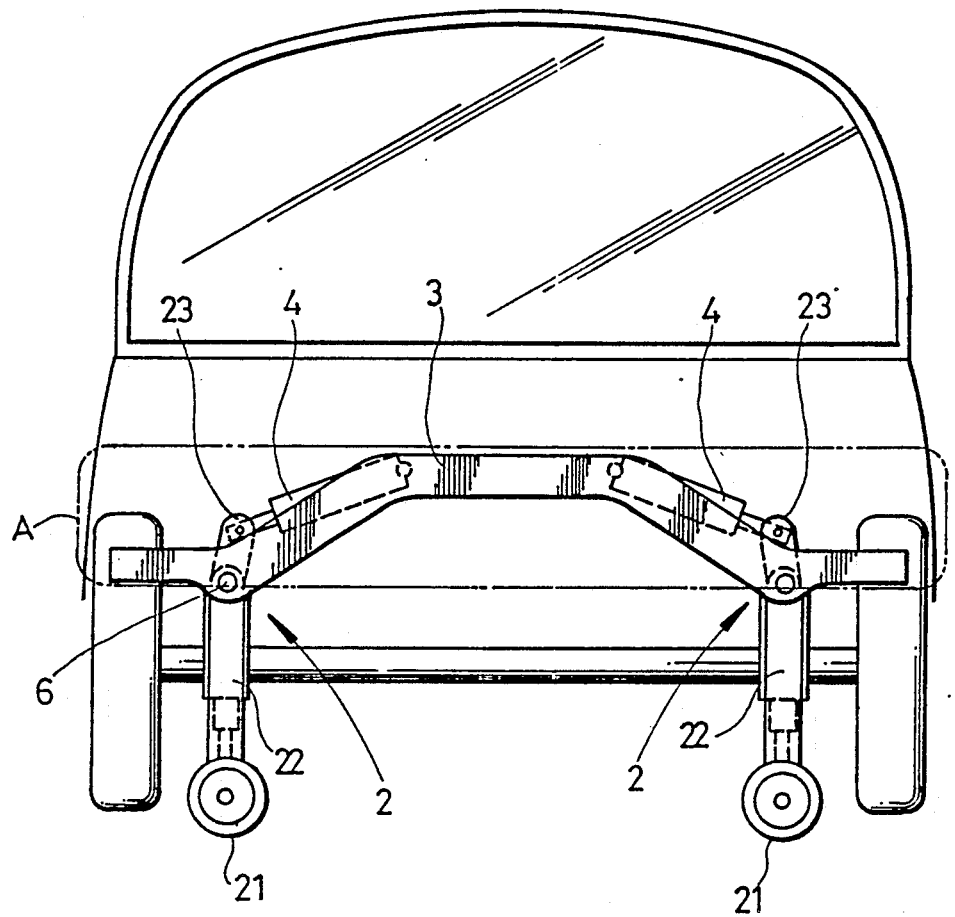
FIG. 1 is a front view of the present invention installed between the bumper and the front vehicle wheel wheels and showing the lateral drive wheels in an extended position.
Figure 2:
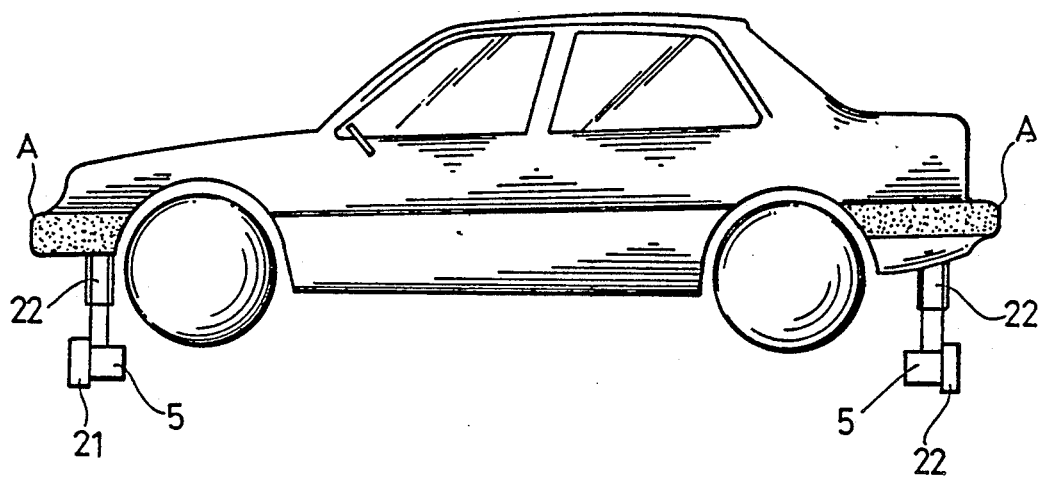
FIG. 2 is a side view of the present invention installed at the front end the rear of a car.
Figure 3:
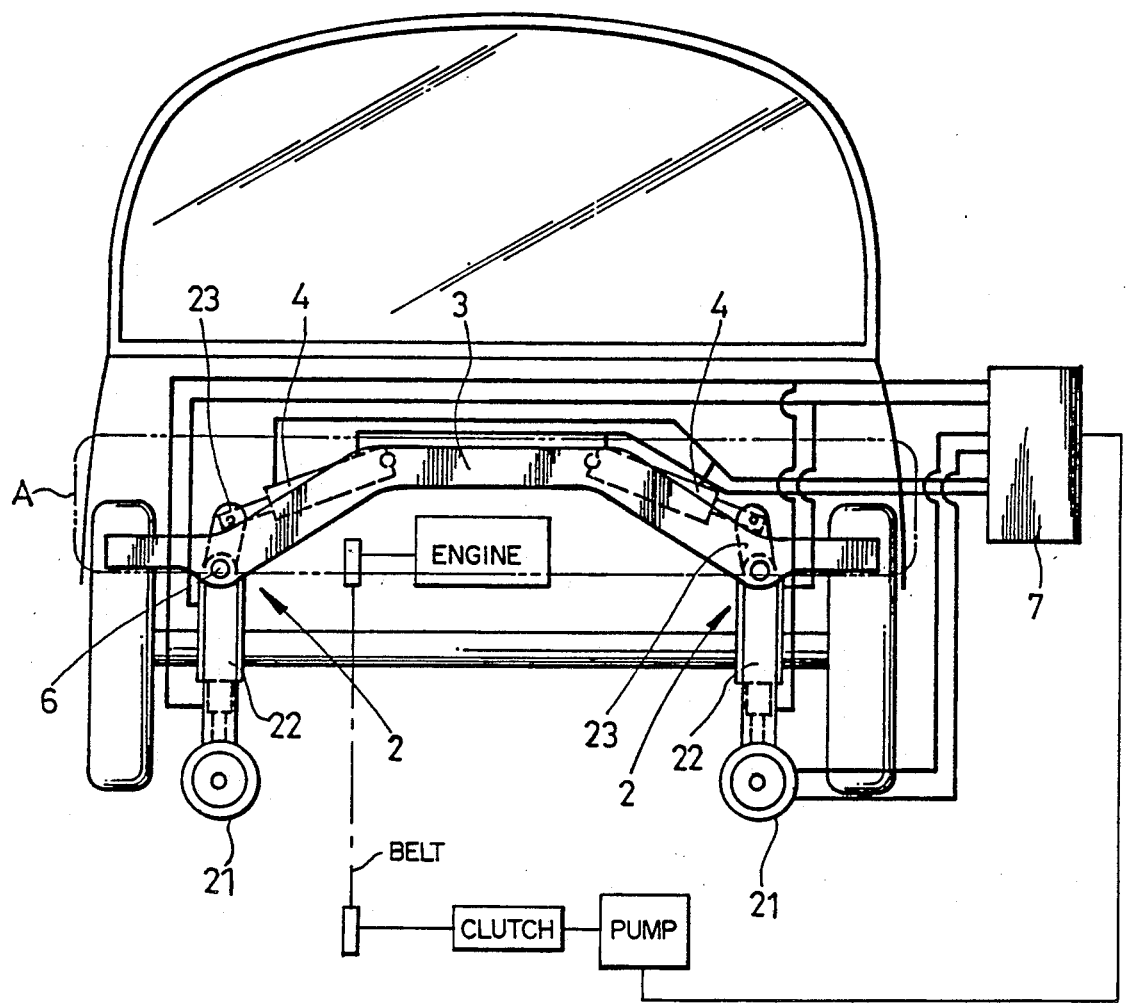
FIG. 3 illustrates the hydraulic circuit of the present invention.

As shown in FIG. 1, a frame 3 is installed between the front bumper A and front wheels of a car wheel and fixed to the frame cross member of the chassis. A similar frame 3 is installed between the rear bumper A and rear wheels of the car. A driving wheel assembly 2 is pivotally connected to each side of the frame 3 by means of a shaft, 6. The driving wheel assembly 2 consists of a reciprocating hydraulic cylinder 22 and a small wheel 21 which is driven by a hydraulic motor 5. Since it is limited by the available space at the bottom of the car and the reciprocating hydraulic cylinder 22 has to have a long enough working stroke to lift the vehicle body from the ground, the present inventor adopts a hydraulic cylinder with a shorter cylinder body to obtain the reciprocating hydraulic cylinder 22 with a longer working stroke. As shown in FIG. 1, a hydraulic cylinder 4 is also pivotally connected to the frame 3 and the end portion of said cylinder 4 is connected to a connecting rod 23 which is connected to the reciprocating hydraulic cylinder 22.

Hydraulic controllers 7 are respectively installed beneath the front and rear chassis and are capable of controlling the front and rear driving wheel assemblies 2. A hydraulic pump is installed near the engine of the car, an electromagnetic clutch is installed onto the shaft of said pump, and the end of said shaft is connected to the shaft of engine through a belt. Therefore, when the remote control signal receiver provided in an actuation car receives the signal, the electromagnetic clutch on the hydraulic pump starts up to transfer the torque energy of the engine in neutral to the hydraulic pump.

The hydraulic oil flowing out from the hydraulic pump is under the control of the hydraulic controller 7 to start the hydraulic cylinder 4, to move the driving wheel 2 to an extended position in which they are perpendicular to the ground through the force of the hydraulic cylinders 4, and then the hydraulic controller 7 activates the reciprocating hydraulic cylinders 22 to extend and thereby to lift the vehicle body from the ground to a suitable height (as shown in FIG. 1). The small wheel 21 at the end portion of each reciprocating hydraulic cylinder 22 is rotatable about an axis which is perpendicular to the steering of rotation of the vehicle wheel, and the associated hydraulic motor 5 is able to drive the small wheel 21 so that the vehicle body, lifted up from the ground by the reciprocating hydraulic cylinder 22 a can be moved by the driving wheel assembly 2 towards the left or the right.

Figure 4:
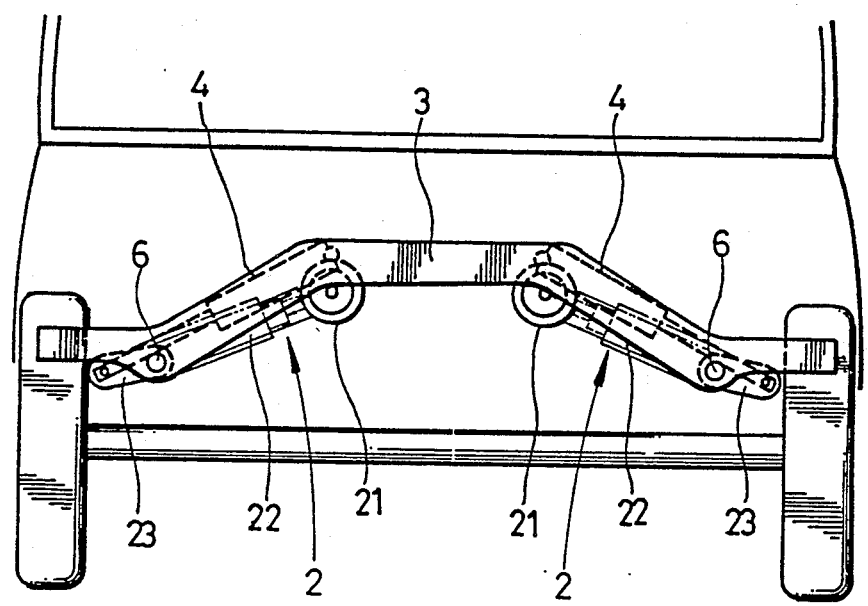
FIG. 4 is a view similar to that of FIG. 1 but showing the lateral drive wheels in a retracted position.

As shown in FIG. 4, the extended driving wheel assembly 2 is retracted to the car chassis through the operation of the hydraulic cylinders 4 by means of the hydraulic controller 7. Numerous tests by the present inventor have shown that, a car provided with the present invention can be driven in a normal fashion without any adverse effects.

I claim:

1. A device for effecting lateral movement of a motor vehicle, comprising:
   an elongate frame for connection to a vehicle chassis, in parallel relationship with the rotation axes of the vehicle wheels, between the front/rear bumper and the front/rear wheels of the vehicle, respectively;
   a lateral driving wheel assembly connected, by means of a pivotal connection, to the frame at each of its two opposite ends and capable of movement, relative to the frame, between an extended position for lifting a vehicle from the ground, and a retracted position, in which the vehicle is not lifted from the ground;
   each lateral driving wheel assembly comprising a reciprocable hydraulic piston-and-cylinder assembly, the one end of which is pivotally connected to the frame by said pivotal connection and a wheel for lateral movement of the vehicle rotatably mounted at the other end of the hydraulic piston-and-cylinder assembly for rotation about an axis extending transversely of the frame;
   hydraulic means for moving the lateral driving wheel assemblies between the extended and the retracted positions;
   a hydraulic motor for driving each said wheel for lateral movement of the vehicle;
   a hydraulic pump for driving the hydraulic means for moving the lateral driving wheel assemblies between the extended and the retracted positions and the hydraulic piston-and-cylinder assemblies, as well as the hydraulic motor for driving each said wheel for lateral movement of the vehicle;
   means for operatively connecting the hydraulic pump to the drive shaft of a vehicle engine;
   a hydraulic controller for controlling the operation of the hydraulic means for moving the lateral driving wheel assemblies between the extended and the retracted positions, the hydraulic piston-and-cylinder assemblies and the hydraulic motor driving each said wheel for lateral movement of the vehicle;
   a remote control device for installation in the driver's cabin of a vehicle and capable of emitting a remote control signal; and
   a remote control signal receiver for receiving signals from the remote control device and operatively connected to the means for operatively connecting the hydraulic pump to the drive shaft of the vehicle engine to activate said latter means.

2. The device according to claim 1, wherein the means for operatively connecting the hydraulic pump to the drive shaft of a vehicle engine comprises an electromagnetic clutch on a shaft of the hydraulic pump and a belt on a free end of said shaft for connection to the drive shaft of the vehicle engine, the remote control signal receiver being operatively connected to the electromagnetic clutch for activating the clutch to transfer torque to the shaft of the hydraulic pump when a remote control signal is received from the remote control device.

3. The device according to claim 1, wherein the hydraulic means for moving the lateral driving wheel assemblies between the extended and the retracted positions comprises a secondary hydraulic piston-and-cylinder assembly operatively connected between the frame and each lateral driving wheel assembly.

4. The device according to claim 1, wherein a hydraulic motor is provided for each said wheel for lateral movement of the vehicle, the motor being located adjacent the said wheel for direct driving of the wheel in either one of two opposite directions.

5. In combination with a motor vehicle, a device for effecting lateral movement of the motor vehicle, comprising:
   an elongate frame connected to the vehicle chassis, in parallel relationship with the rotation axes of the vehicle wheels, between the front/rear bumper and the front/rear wheels of the vehicle, respectively;
   a lateral driving wheel assembly connected, by means of a pivotal connection, to the frame at each of its two opposite ends and capable of movement, relative to the frame, between an extended position for lifting the vehicle from the ground, and a retracted position, in which the vehicle is not lifted from the ground;
   each lateral driving wheel assembly comprising a reciprocable hydraulic piston-and-cylinder assembly, the one end of which is pivotally connected to the frame by said pivotal connection and a wheel for lateral movement of the vehicle rotatably mounted at the other end of the hydraulic piston-and-cylinder assembly for rotation about an axis which is perpendicular to the rotation axes of the vehicle wheels;
   hydraulic means for moving the lateral driving wheel assemblies between the extended and the retracted positions;
   a hydraulic motor for driving each said wheel for lateral movement of the vehicle;
   a hydraulic pump for driving the hydraulic means for moving the lateral driving wheel assemblies between the extended and the retracted positions and the hydraulic piston-and-cylinder assemblies, as well as the hydraulic motor for driving each said wheel for lateral movement of the vehicle;

means operatively connecting the hydraulic pump to the drive shaft of the vehicle engine;

a hydraulic controller for controlling the operation of the hydraulic means for moving the lateral driving wheel assemblies between the extended and the retracted positions, the hydraulic piston-and-cylinder assemblies and the hydraulic motor driving each said wheel for lateral movement of the vehicle;

a remote control device installed in the driver's cabin of the vehicle and capable of emitting a remote control signal; and a remote control signal receiver for receiving signals from the remote control device an operatively connected to the means operatively connecting the hydraulic pump to the drive shaft of the vehicle engine to activate said latter means.

6. The combination according to claim 5, wherein the means operatively connecting the hydraulic pump to the drive shaft of the vehicle engine comprises an electromagnetic clutch on a shaft of the hydraulic pump and a belt on a free end of said shaft which is connected to the drive shaft of the vehicle engine, the hydraulic pump being located in proximity of the vehicle engine and the remote control signal receiver being operatively connected to the electromagnetic clutch for activating the clutch to transfer torque to the shaft of the hydraulic pump when a remote control signal is received from the remote control device.

7. The combination according to claim 5, wherein the hydraulic means for moving the lateral driving wheel assemblies between the extended and the retracted positions comprises a secondary hydraulic piston-and-cylinder assembly operatively connected between the frame and each lateral driving wheel assembly.

8. The combination according to claim 5, wherein a hydraulic motor is provided for each said wheel for lateral movement of the vehicle, the motor being located adjacent the said wheel for direct driving of the wheel in either one of two opposite directions.

* * * * *